US007992653B2

(12) United States Patent
Zamora et al.

(10) Patent No.: US 7,992,653 B2
(45) Date of Patent: Aug. 9, 2011

(54) FOAMED FLUID ADDITIVE FOR UNDERBALANCE DRILLING

(75) Inventors: Frank Zamora, San Antonio, TX (US); Sarkis Kakadjian, San Antonio, TX (US)

(73) Assignee: Clearwater International DE (US)

( * ) Notice: Subject to any disclaimer, the term of this patent is extended or adjusted under 35 U.S.C. 154(b) by 0 days.

(21) Appl. No.: 11/736,992

(22) Filed: Apr. 18, 2007

(65) Prior Publication Data
US 2008/0257554 A1  Oct. 23, 2008

(51) Int. Cl.
 *E21B 43/00* (2006.01)
(52) U.S. Cl. .......................... 175/65; 166/309; 166/372
(58) Field of Classification Search .................. 166/309, 166/372; 507/102, 202, 269; 175/65
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | 8/539 |
| 4,067,389 A | 1/1978 | Savins | 166/246 |
| 4,108,782 A | 8/1978 | Thompon | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |

(Continued)

FOREIGN PATENT DOCUMENTS

CA  2125513  1/1995

(Continued)

OTHER PUBLICATIONS

U.S. Appl. No. 12/075,461, filed Mar. 11, 2008, Gatlin et al.

(Continued)

*Primary Examiner* — Giovanna C Wright
*Assistant Examiner* — Nicole A Coy
(74) *Attorney, Agent, or Firm* — Robert W Strozier (57) ABSTRACT

A method of drilling or gas-lifting is disclosed where the methods including the use of a foaming agent and a gas, where the foaming agent is a keratin and the hydrostatic pressure of the fluid in the well is for a portion of the drilling or gas-lift operation less than an hydrostatic pressure of the formation being drilled or under production.

22 Claims, 4 Drawing Sheets

U.S. PATENT DOCUMENTS

| | | | |
|---|---|---|---|
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,211,859 A | 5/1993 | Horton | |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffe et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,257,335 B1 | 7/2001 | Nguyen | |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,367,550 B1 | 4/2002 | Chatterji et al. | |
| 6,454,004 B2 * | 9/2002 | Reddy et al. | 166/293 |
| 6,454,008 B1 * | 9/2002 | Chatterji et al. | 166/308.6 |
| 6,547,871 B2 | 4/2003 | Chatterji et al. | |
| 6,725,931 B2 | 4/2004 | Nguyen et al. | 166/280.2 |
| 6,734,146 B2 | 5/2004 | Chatterji et al. | |
| 6,756,345 B2 | 6/2004 | Pakulski et al. | 507/246 |
| 6,793,018 B2 | 9/2004 | Dawson et al. | 166/300 |
| 6,793,730 B2 | 9/2004 | Reddy et al. | |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 2002/0049256 A1 | 4/2002 | Bergeron, Jr. | 514/674 |
| 2002/0165308 A1 | 11/2002 | Kinniard et al. | 524/492 |
| 2003/0092584 A1 | 5/2003 | Crews | |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0116296 A1* | 6/2006 | Kippie et al. | 507/244 |
| 2006/0194700 A1 | 8/2006 | Gatlin et al. | 507/203 |
| 2007/0032693 A1 | 2/2007 | Gatlin et al. | 507/239 |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1* | 2/2008 | Kippie et al. | 507/119 |

FOREIGN PATENT DOCUMENTS

| | | |
|---|---|---|
| CA | 2007965 | 2/1996 |
| DE | 4027300 | 5/1992 |
| EP | 0104927 A3 | 7/1984 |
| EP | 0730018 A1 | 9/1996 |
| GB | 775376 | 10/1954 |
| GB | 816337 A | 7/1959 |
| GB | 1073338 A | 6/1967 |
| JP | 10001461 | 6/1988 |
| JP | 08151422 | 11/1996 |
| JP | 10110115 A | 4/1998 |
| JP | 2005194148 A | 7/2005 |
| WO | WO 98/19774 | 5/1998 |
| WO | WO 98/56497 | 12/1998 |

OTHER PUBLICATIONS

U.S. Appl. No. 11/554,834, filed Oct. 31, 2006, Venditto et al.
U.S. Appl. No. 11/765,306, filed Jun. 19, 2007, Kakadjian et al.
U.S. Appl. No. 11/748,248, filed May 14, 2007, Thompson et al.

U.S. Appl. No. 11/736,971, filed Apr. 18, 2007, Kippie et al.
U.S. Appl. No. 11/767,384, filed Jun. 22, 2007, Sweeney et al.
U.S. Appl. No. 11/741,110, filed Apr. 27, 2007, Wilson, Jr. et al.
U.S. Appl. No. 11/677,434, filed Feb. 21, 2007, Wanner et al.
U.S. Appl. No. 11/736,992, filed Apr. 18, 2007, Zamora et al.
U.S. Appl. No. 11/760,581, filed Jun. 8, 2007, Schwartz.
U.S. Appl. No. 12/029,335, filed Feb. 11, 2008, Kakadjian et al.
1983, Sartori, F. and Savage, D.W., Sterically Hindered Amines for CO2 Removal from Gases, Ind. Eng. Chem. Fundam. 1983, 22, 239-249.
1999, Fushslueger, U., Socher, G., Grether, H-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.

1975, Kauffman, W.J., Observations on the Synthesis and Characterization of N,N',N"-Tris-(dimethylaminopropyly)hexahydro-s-triazine and isolable intermediates, XP009005168.
1896, Delepine, M., Effect of Hydrogen Sulfide on Trimethyltrimethyl Triamine, Bull. Soc. Chim., 1896, 14, 889-891 (English Translation).
1896, Delepine, M., Effect of Hydrogen Sulfide and Trimethyltrimethyl Triamine, Ann. Chim. Phys., 1896, 4, 114-133 (English Translation).
Paquin, A.M., Reaction of Primary Amines with Aliphatic Aldehydes, Chem. Ber., 1949, 82, 316-326 (English Translation).
Castillo, M., Avila, Y.S., Rodrigues, R.E., Viloria, A., H2S Liquid Scavengers, Their Corrosivity Properites and the Compatibility with Other Down Stream Processes, Corrosion 2000, paper 00491.

* cited by examiner

FOAMED FLUID ADDITIVE FOR UNDERBALANCE DRILLING

BACKGROUND OF THE INVENTION

1. Field of the Invention

The present invention relates to a method for underbalanced drilling including the step of drilling an oil and/or gas well with a drilling fluid including a biodegradable foaming composition and a gas. The present invention also relates to a method for gas lift production including the step of injecting a gas and a foaming agent into the production fluids to decrease a column hydrostatic pressure and increase fluids production.

More particularly, the present invention relates to a method for underbalanced drilling including the step of drilling an oil and/or gas well with a drilling fluid including a biodegradable foaming composition and a gas, where the foaming composition includes a keratin. Analogously, the foaming composition and gas are suitable for gas lift production operations.

2. Description of the Related Art

In oil and gas drilling operations, it has been the almost universal practice up until recent years to circulate a liquid, such as water, oil, a water-in-oil emulsion, or an oil-in-water emulsion, usually with mud solids, clay particles, suspended therein, to and from the drilling zone during the drilling operation. One of the functions in circulating these drilling fluids, usually in the form of a drilling mud, is to remove drilled solids from the bit and lift cuttings from the bore. As can be readily understood the drilling liquid must be circulated under high pressure to assure entrainment of cuttings and expulsion of mud from the bore hole.

In recent years, some wells have been successfully drilled at a reduced pressure by a different technique in which a compressed gas, such as air, is pumped into the well at the drilling site. This compressed gas flows rapidly up the well bore annulus around the drill collar carrying with it the drilled solids and thus removing them from the drill hole. While in some instances, the drilling operation is essentially a dry process in many formations, water high in electrolyte concentration, enters the bore hole from adjacent water-containing strata. Such water invasion most often occurs while drilling in or through a water bearing subterranean zone, but may also be encountered in any area in the vicinity of trapped underground water.

Some of the advantages of the gas drilling method over the more conventional mud drilling method include increased penetration rate, longer bit life, accurate location of water-bearing zones and measurement of flow, precise location of oil and gas bearing zones, especially those of low formation pressure, flow and pressure testing of productive zones without resort to drill stem tests, a lessening of possible contamination of prospective or known producing zones, and greater flexibility in physical-chemical alteration of the drilling fluid to meet particular down hole conditions. However, one difficulty in mist or dry gas drilling where water seeps into the bore and accumulates in the drilling zone is that the drilled solids tend to agglomerate as the drill string rotates. These agglomerated masses become too heavy to be lifted out by the gas so that antiballing agents, and foaming agents must be introduced into the bore to prevent this condition.

In recent years, the technology of air and mud drilling has been combined in an attempt to provide drilling foams which have greater lifting strength than air but which do not have the pressure limitations of drilling muds.

The rheological properties of aqueous foams are of great importance for a number of applications in petroleum production. These properties include high flow rates in tubes or pipes and in porous media such as oil-bearing sandstones. Aqueous foam has advantages in oil fields that contain viscous oil in low pressure reservoirs. In these operations, the foam raises to the surface not only sand pulverized by the bit but also pebbles and rocks of considerable size.

The requirements for utilization of an aqueous foam in subterranean formations include high stability with waters containing appreciable quantities of soluble salts, such as sodium chloride, calcium salts and/or magnesium salts, and the capability for handling a variety of foam breaking elements such as crude oil and solids. Further the foam must not degrade under extremes of physical environments.

Numerous foam compositions have been proposed and used, however most have proven unsatisfactory in one respect or another. Among the various classes of foaming compositions are nonionics; however, these are affected by salts and high temperatures encountered in drilling. Although many anionic surfactants provide acceptable foams in soft waters, they form foam breaking precipitates in the presence of brine and/or hard water. Cationics are ineffective foamers because of their intolerance to high salinity.

U.S. Pat. No. 6,734,146 B2 discloses a Keratin material as a foaming agent in fracturing fluids, but makes no mention of the use of such foaming agents in underbalanced drilling or in gas lift operations where foamer agent properties are different and needs and end results are different.

The following U.S. Pat. Nos. 6,367,550, 6,454,004, 6,793,730, 6,547,871, and 6,454,008, all include examples of the use of keratin in various oil and industrial applications. However, none of these patents disclose the use of keratins in underbalanced drilling applications as biodegradable, highly effective foaming agent or agent when added to the drilling fluid along with a gas significantly reduces column overhead pressure and reduces column hydrostatic pressure to a value less than or equal to the hydrostatic pressure of the formation.

Thus there is a need in the art for a superior foaming agent especially for use in underbalanced or pressure monitored drilling applications, where the foaming agent is environmentally friendly and biodegradable.

SUMMARY OF THE INVENTION

The present invention provides a method for underbalanced drilling including the step of drilling an oil and/or gas well with a drilling fluid including an effective amount of an hydrolyzed keratin composition and an effective amount of a gas, where the amounts are sufficient to reduce an hydrostatic pressure of the drilling fluid to a pressure at or below an hydrostatic pressure of a formation into which the well is being drilled.

The present invention also provides a method for controlled pressure drilling including the step of controlling an hydrostatic pressure of a drilling fluid by changing an amount of a keratin in the drilling fluid and/or an amount of gas in the drilling fluid to achieve a controlled drilling fluid hydrostatic pressure during drilling, where the hydrostatic pressure is less than an hydrostatic pressure of at least a portion of the formation into which the well is being drilled.

The present invention provides a method for drilling well including the step of drilling an oil and/or gas well for a first section with a drilling fluid at an hydrostatic pressure above an hydrostatic pressure of a formation being drilling and drilling a second section with a drilling fluid including an effective amount of a keratin composition and an effective amount of a gas, where the amounts are sufficient to reduce an hydrostatic pressure of the drilling fluid to a pressure at or below an hydrostatic pressure of a formation into which the well is being drilled. The method can also include the step of changing the amount of keratin and/or gas to control an hydrostatic pressure of the drilling fluid during drilling.

The present invention provides a method for gas lift production including the step of injecting into production fluids of a producing oil and/or gas well at one or a plurality of locations a gas lift composition including an effective amount of an keratin composition and an effective amount of a gas, where the amounts are sufficient to reduce an hydrostatic pressure of the production fluids increase well production.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventors have found that a bio-degradable foaming composition for using in underbalanced or controlled pressure drilling can be formulated, where the foaming composition including an amino acid bio-material such as keratin. The foamer can be introduced into an underbalanced drilling system using conventional methods. The foamer can also be an additive in production chemicals, especially where the production chemicals are injected into a producing oil and/or gas well through a capillary tubing string downhole, where the foaming agent and gas are allowed to commingle downhole with production fluids to generate a foam that lightens the hydrostatic pressure of the column increasing an amount of production fluids produced by the well. The foamer can also be introduced into a producing well via a soap stick including a foaming composition of this invention. The difference in this invention is in the use of an unique environmentally friendly foamer for underbalance drilling applications, mist, and stable foam.

The foaming compositions of this invention can also be used in conjunction with other additives. The inventors have found foaming compositions of this invention can change characteristics of a fluid to which the composition is added so that the composition actually improves an activity of other additives and the additive can improve properties or characteristics of the foam. The properties of the foaming compositions can be modified for specialty applications through the addition of foam modifying agents including low temperature agents such as winterizing and/or anti-freeze agents, foam boosters, solvents such as isopropyl alcohol (IPA), the sodium salts of short chain alpha olefin sulfonates (AOS), fatty acids (lauric acid, oleic acid, stearic acid, etc.) or other modifiers to modify or augment the basic characteristics of the foaming composition for a given application. The foaming compositions of this invention are ideally suited for drilling operations, especially underbalanced drilling operations, recyclable drilling operations, coiled tubing drilling and clean out operations, capillary coiled tubing (CCT) production applications (foaming CCT production), any foam application where noxious and/or corrosive components need to be controlled, reduced or substantially eliminated or scale, oxygen and/or heavy hydrocarbon materials need to be controlled, recyclable foam drilling applications, well intervention service applications, well clean out applications, formation clean outs (fracturing or pumping foam into the formation to open formation for oil and/or gas production), reduce or control scale formation, increase or control heavy hydrocarbon, wax or asphaltene, dispersion, waste management applications (treatment of sewage and sludge) or similar applications. In unbalanced drilling operations, the foaming agent of this invention allows for the well fluid's hydrostatic head pressure to be reduced below that of the formation pressure by forming a foam that is then broken at the top of the well so that the well fluids and produced hydrocarbons can be separated and the well fluids refoamed, for continued operations, while allowing downhole control over the concentration of noxious and/or corrosive species or components in the well fluids.

The present invention broadly relates to a method for foaming fluids including the step of adding an effective amount of a foaming composition of this invention and an effective amount of a gas to a fluid to result is a foamed fluid. The foamed fluid can be used in drilling, recyclable drilling, coiled tubing drilling operations, especially underbalanced drilling and controlled pressure drilling, and production operations, capillary coiled tubing (CCT) production operations, and gas lift production operations, where the foamed fluid decreases a hydrostatic pressure of the fluid in the well improving drilling operations and production operations. The method can also include the step of breaking the foam with the addition of an effective amount of a defoamer to recover the fluid. The method can also include repeating the adding or foam making step and foam breaking step continuously or over a set period of time or a set number of foaming/defoaming cycles. The repeated application of the foaming and defoaming steps is called a recycle method.

The main additive for underbalanced drilling fluid is a foamer. Foamers include are based on a variety of chemistries. Most often these chemistries include one or more components that are not environmentally friendly. This invention present invention is based on using a foamer typically used in firefighting and in certain oilfield applications, e.g., cementing and fracturing. The foamer comprises an hydrolyzed keratin. The inventors have found that an hydrolyzed keratin based foaming compositions when used at optimum concentrations in water generate stable foams. The hydrolyzed keratin are ideally well suited from using in underbalanced drilling and in gas lift production applications, because the hydrolyzed keratin based foaming composition produce stable long lived foams that are capable of lowering an hydrostatic pressure of a fluid column to at or below that of the formation so that during drilling materials are not transmitted into the formation, cutting are lift out of the well during drill and during gas lift applications, increased production is achieved.

Suitable Reagents

Suitable winterizing agents include, without limitation, formate salts such as lithium formate, sodium formate, potassium formate, cesium formate, triethyanolamine formate, or the like, or acetates such as potassium acetate, cesium acetate, ammonium acetate, triethyanolamine acetate, or the like or mixtures or combinations.

Suitable foam boosters include, without limitation, cellosolves of the general formula $R^9OCH_2CH_2OH$ where $R^9$ is an alkyl group having between about 2 and about 8 carbon atoms or the like or mixtures or combinations. A preferred cellosolve is butylcellosolve. It should recognize by ordinary artisans that cellosolves are not considered environmentally friendly under all condition. Some of the cellosolves are toxic to mammals, but are not toxic to algae, bacteria or other microorganisms and are 80% or more biodegradable. Thus, environmentally friendly and biodegradable do not mean that every component in each formulation is environmentally friendly under all conditions or totally biodegradable, but that compared to many competitive foaming agents, the foaming agents of this invention have superior biodegradability and environmental friendliness.

Suitable anti-freeze agents include, without limitation, alcohols, glycols, glycerols, or other freezing point depressing agents or the like or mixtures or combinations.

Suitable solvents include, without limitation, water, alcohols, ethers, esters or mixtures or combinations thereof. Preferred alcohols include, without limitation, methanol, ethanol, isopropanol, propanol, or the like or mixtures or combinations. Preferred ether include, without limitation, dimethyl ether, diethyl ether, dipropyl ether, methylethyl ether, methylpropyl ether, ethylpropyl ether, or the like or mixture or combinations thereof. Preferred esters include, without limitation, ethyl Ethyl Acetate, -butyl Acetate, Ester Solvent EEP, Glycol Ether EB Acetate, or the like, propylene Based Glycol Ethers or the like, or mixtures or combinations thereof.

Suitable sodium salts of alpha olefin sulfonates (AOSs), include, without limitation, any alpha olefin sulfonate. Preferred AOSs including short chain alpha olefin sulfonates having between about 2 and about 10 carbon atoms, particularly, between 4 and 10 carbon atoms, longer chain alpha olefin sulfonates having between about 10 and about 24 carbon atoms, particularly, between about 10 and 16 carbon atoms or mixtures or combinations thereof.

Suitable foam modifiers that can be used in place of or in conjunction with AOS include, without limitation, cyclamic acid salts such as sodium (cyclamate), potassium, or the like, salts of sulfonated methyl esters having between about 12 and about 22 carbon atoms, where the salt is sodium, potassium, ammonium, alkylammonium, 2-aminoethanesulfonic acid (taurine) or the like such as Alpha-Step MC-48 from Stepan Corporation. Other additives includes salts of 2-aminoethane sulfonic acids, where the salt is an alkali metal, ammonium, alkylammonium, or like counterions.

Suitable fatty acids include, without limitation, lauric acid, oleic acid, stearic acid or the like or mixtures or combinations.

Suitable foam enhancers include, without limitation, a foam enhancer selected from the group consisting of a linear dodecyl benzene sulfonic acid salt, a sarcosinate salt, and mixtures or combinations thereof. Preferred linear dodecyl benzene sulfonic acid salt include, without limitation, ammonium linear dodecyl benzene sulfonic acid, alkylammonium linear dodecyl benzene sulfonic acid, alkanolamine ammonium linear dodecyl benzene sulfonic acid, lithium linear dodecyl benzene sulfonic acid, sodium linear dodecyl benzene sulfonic acid, potassium, cesium linear dodecyl benzene sulfonic acid, calcium linear dodecyl benzene sulfonic acid, magnesium linear dodecyl benzene sulfonic acid and mixtures or combinations thereof. Preferred sarcosinates include, without limitation, sodium lauryl sarcosinate, potassium lauryl sarcosinate, HAMPOSYLN-Acyl Sarcosinate Surfactants, Sodium N-Myristoyl Sarcosinate, and mixtures or combinations thereof.

Suitable sulfur scavengers for use in the compositions of this invention include, without limitation, any compound capable of reacting with hydrogen sulfide, mercaptans, alkyl di and polysulfides and converting them to more benign sulfur-containing compounds. Preferred sulfur scavengers include amines, reaction products of aldehydes or aldehyde donors and amines or amine donors such as imines, triazines, amine-aldehyde polymers, etc., or any other compound capable of reaction with noxious sulfur-containing species such as hydrogen sulfide, thiols, etc. or mixtures or combinations thereof.

Scale Control

Suitable additives for Scale Control and useful in the compositions of this invention include, without limitation: Chelating agents, e.g., Na, K or $NH_4^+$ salts of EDTA; Na, K or $NH_4^+$ salts of NTA; Na, K or $NH_4^+$ salts of Erythorbic acid; Na, K or $NH_4^+$ salts of thioglycolic acid (TGA); Na, K or $NH_4^+$ salts of Hydroxy acetic acid; Na, K or $NH_4^+$ salts of Citric acid; Na, K or $NH_4^+$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphonic acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof; Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaeryithrol, neopentyl glycol or the like; Tris & Tetra hydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Corrosion Inhibitors

Suitable additives for Corrosion Inhibition and for use in the compositions of this invention include, without limitation: quaternary ammonium salts e.g., chloride, bromides, iodides, dimethylsulfates, diethylsulfates, nitrites, hydroxides, alkoxides, or the like, or mixtures or combinations thereof; salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof; fatty acid pyrimidines; monoimidazolines of EDA, DETA or higher ethylene amines, hexamethylene diamine (HMDA), tetramethylenediamine (TMDA), and higher analogs thereof; bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of poly amines such as TMDA, HMDA and 1,2-diaminocyclohexane; TGA salt of imidazoline derived from DETA with tall oil fatty acids or soy bean oil, canola oil, or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy propylamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: Cellosolves available from DOW Chemicals Company; Cellosolve acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or C10 to C24 amines or monohalogenated alkyl and aryl chlorides; quaternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Compositional Ranges

The foaming agent for using in underbalanced drilling includes an effective amount of a hydrolyzed keratin. The foaming agent can also include one or more fluid property modification agents, agents that modify a chemical and/or physical property or characteristic of fluids or fluid streams (single phased or multi-phased), where the properties or characteristics include reducing, reducing below a desired level or substantially eliminating noxious species (e.g., $H_2S$, $CO_2$, thiols, etc.) or converting noxious species into more benign or benign species.

Some embodiments of the foaming composition this invention include:
(a) 100 wt. % of a hydrolyzed keratin;
(b) from about 20 wt. % to about 80 wt. % of one or more hydrolyzed keratins and from about 80 wt. % to about 20 wt. % of one or more fluid property modification agents;
(c) from about 30 wt. % to about 70 wt. % of one or more foaming agents and from about 70 wt. % to about 30 wt. % of one or more fluid property modification agents;
(d) from about 40 wt. % to about 60 wt. % of one or more hydrolyzed keratins and from about 60 wt. % to about 40 wt. % of one or more fluid property modification agents; and
(e) from about 45 wt. % to about 55 wt. % of hydrolyzed keratins and from about 55 wt. % to about 45 wt. % of one or more fluid property modification agents.

Other embodiments include:
(a) from about 15 wt. % to about 50 wt. % of one or more hydrolyzed keratins, from about 15 wt. % to about 50 wt. % of one or more fluid property modification agents and from about 15 wt. % to about 50 wt. % of a purified water;
(b) from about 20 wt. % to about 50 wt. % of one or more hydrolyzed keratins, from about 20 wt. % to about 50 wt. % of one or more fluid property modification agents and from about 20 wt. % to about 50 wt. % of a purified water;
(c) from about 25 wt. % to about 45 wt. % of one or more hydrolyzed keratins, from about 25 wt. % to about 45 wt. % of one or more fluid property modification agents and from about 25 wt. % to about 45 wt. % of a purified water; and
(d) from about 30 wt. % to about 40 wt. % of one or more hydrolyzed keratins, from about 30 wt. % to about 40 wt. % of one or more fluid property modification agents and from about 30 wt. % to about 40 wt. % of a purified water.

Experimental Section

The following fluids where tested using the indicated concentration of a hydrolyzed keratin foaming composition. The foaming composition was added to a variety of brine solutions or to de-ionized (DI) water. The term lb/bbl means pounds per barrel, a common unit used in the field. The term GPT means gallons per thousand gallons. The foaming composition at the indicated concentrations was added to the Brine or DI water and the composition was mixed in a Lab Hamilton Beach Mixer on high for 45 sec to 60 sec. The composition foamed composition was then transferred from the blender to a 1,000 mL of 500 mL graduated cylinder. The foam height (number of mL of composition after transfer) and half life (the time required for the foam to reduce to ½ its original height) were then measured in minutes and second. The percent foam was derived from the foam height data and the starting composition volume. The results are tabulated in Table I and Table II.

TABLE I

Hydrolyzed Keratin Foam Test

| BRINE (100 mL) | KERATIN (lb/bbl) | FOAM HT. (mL) | HALF-LIFE (min:sec) |
|---|---|---|---|
| 2% KCl | 0.42 | 210 | 1:03 |
| 2% KCl | 0.84 | 330 | 5:04 |
| 2% KCl | 1.26 | 370 | 6:36 |
| 2% KCl | 2.1 | 440 | 8:58 |
| 2% KCl | 4.2 | 470 | 12:22 |
| 2 GPT WCS-631LC | 0.42 | 180 | 0:29 |
| 2 GPT WCS-631LC | 0.84 | 240 | 1:51 |
| 2 GPT WCS-631LC | 1.26 | 340 | 6:34 |
| 2 GPT WCS-631LC | 2.1 | 430 | 14:29 |
| 2 GPT WCS-631LC | 4.2 | 510 | 16:48 |
| 6% KCl | 0.42 | 180 | 0:43 |
| 6% KCl | 0.84 | 340 | 4:15 |
| 6% KCl | 1.26 | 410 | 8:39 |
| 6% KCl | 2.1 | 450 | 11:34 |
| 6% KCl | 4.2 | 490 | 14:59 |
| 2% CaCl2 | 0.42 | 200 | 0:25 |
| 2% CaCl2 | 0.84 | 290 | 5:09 |
| 2% CaCl2 | 1.26 | 340 | 9:49 |
| 2% CaCl2 | 2.1 | 440 | 13:05 |
| 2% CaCl2 | 4.2 | 530 | 21:48 |
| DI WATER | 0.42 | 160 | 0:22 |
| DI WATER | 0.84 | 220 | 1:08 |
| DI WATER | 1.26 | 310 | 3:26 |
| DI WATER | 2.1 | 440 | 15:33 |
| DI WATER | 4.2 | 480 | 18:43 |

WCS-631LC is an additive available for Clearwater International, LLC of Houston, TX.

TABLE II

Percent Foam

| BRINE (100 mL) | KERATIN (lb/bbl) | PERCENT FOAM (%) |
|---|---|---|
| 2% KCl | 0.42 | 52.38 |
| 2% KCl | 0.84 | 69.70 |
| 2% KCl | 1.26 | 72.97 |
| 2% KCl | 2.1 | 77.27 |
| 2% KCl | 4.2 | 78.72 |
| 2 GPT WCS-631LC | 0.42 | 44.44 |
| 2 GPT WCS-631LC | 0.84 | 58.33 |
| 2 GPT WCS-631LC | 1.26 | 70.59 |
| 2 GPT WCS-631LC | 2.1 | 76.74 |
| 2 GPT WCS-631LC | 4.2 | 80.39 |
| 6% KCl | 0.42 | 44.44 |
| 6% KCl | 0.84 | 70.59 |
| 6% KCl | 1.26 | 75.61 |
| 6% KCl | 2.1 | 77.78 |
| 6% KCl | 4.2 | 79.59 |
| 2% CaCl | 0.42 | 50.00 |
| 2% CaCl | 0.84 | 65.52 |
| 2% CaCl | 1.26 | 70.59 |
| 2% CaCl | 2.1 | 77.27 |
| 2% CaCl | 4.2 | 81.13 |
| DI WATER | 0.42 | 37.50 |
| DI WATER | 0.84 | 54.55 |
| DI WATER | 1.26 | 67.74 |
| DI WATER | 2.1 | 77.27 |
| DI WATER | 4.2 | 79.17 |

Figure 1:
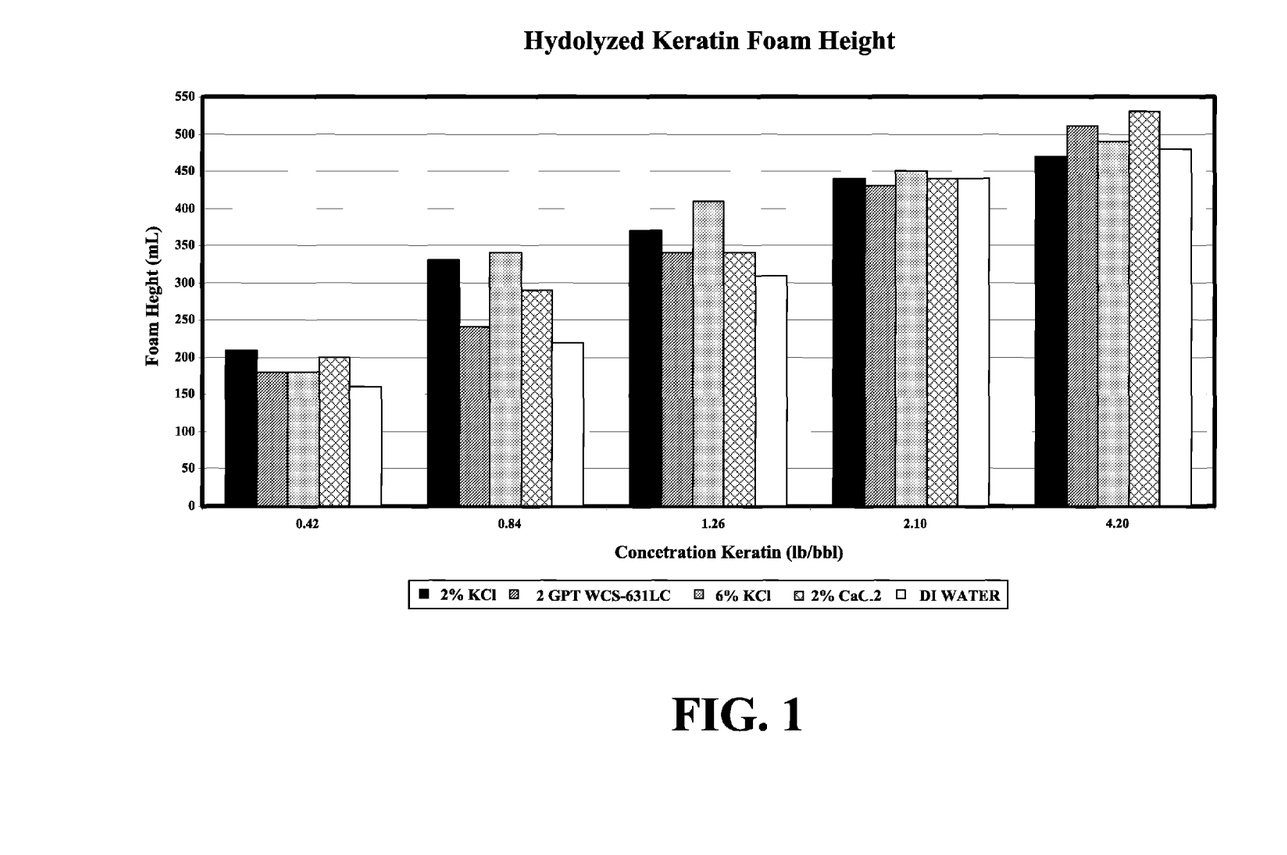
FIG. 1 depicts a plot of foam heights of a foaming composition including hydrolyzed keratin in various aqueous fluids.
Figure 2:
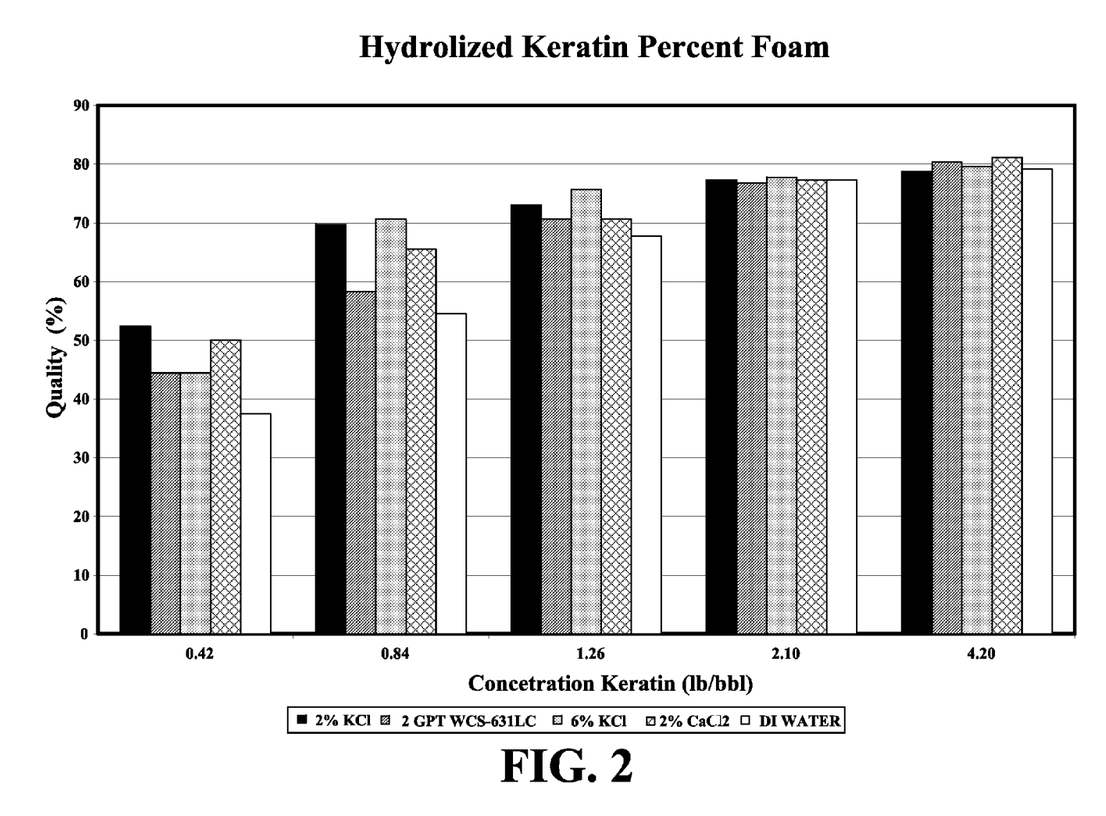
FIG. 2 depicts a plot of percentage foam of a foaming composition including hydrolyzed keratin in various aqueous fluids.
Figure 3:
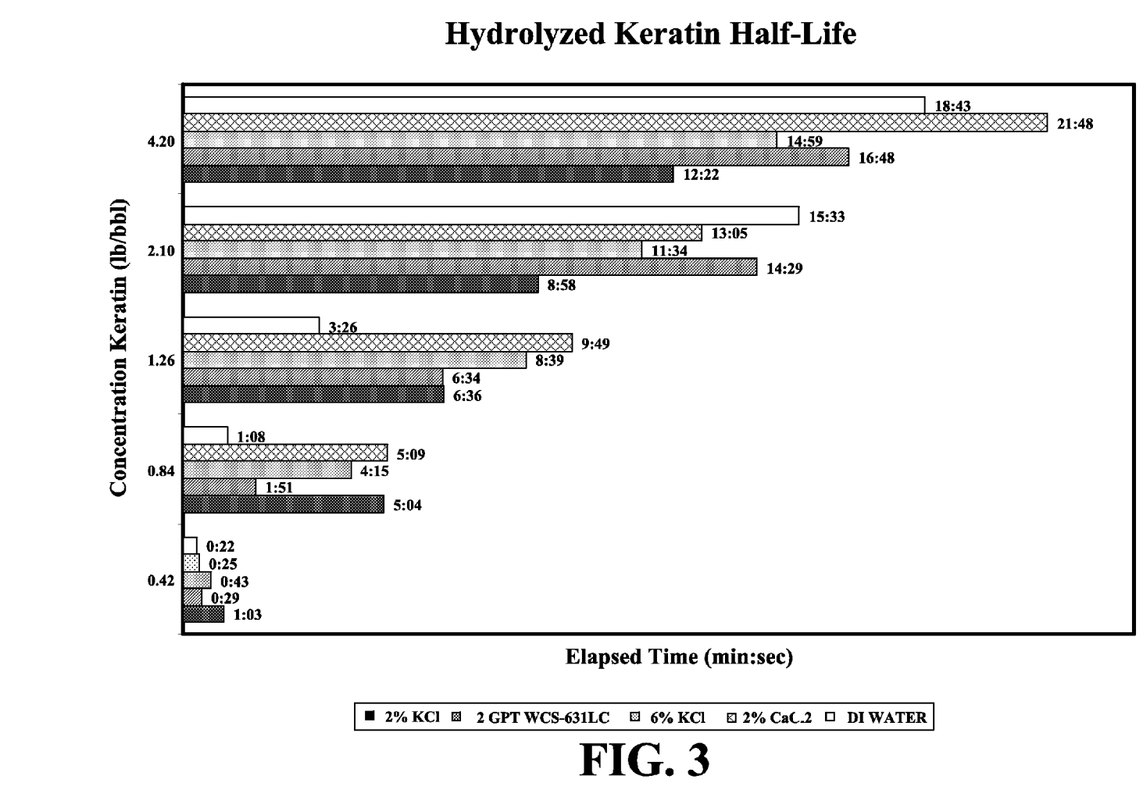
FIG. 3 depicts a plot of half lives of a foaming composition including hydrolyzed keratin in various aqueous fluids.
Figure 4A:
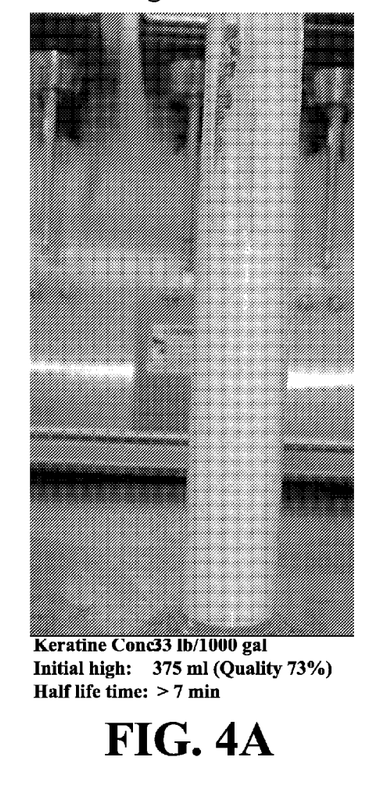
FIGS. 4A&B depict photographs of foaming with keratin oil based foaming composition of this invention in San Antonio TAP water.
Figure 4B:
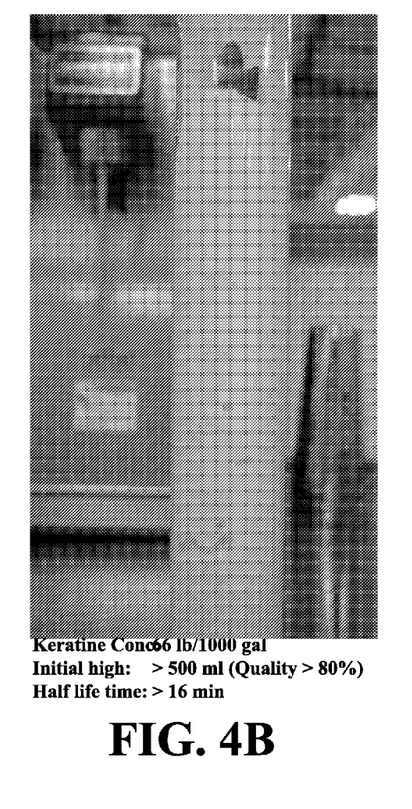

FIGS. 1-3 show plots of the data tabulated in Table I and II. FIGS. 4A&B show photographs of tap water foamed with a keratin based foaming composition. The data clearly evidences the capability of foaming compositions including hydrolyzed keratine are effective and efficient foaming agents for use in drilling fluids for underbalanced or managed pressure drilling.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for drilling comprising the steps of
drilling an oil and/or gas well with a drilling fluid including an effective amount of a bio-degradable foaming composition and an effective amount of a gas, where the foaming composition comprises at least one hydrolyzed keratin and the amounts are sufficient to reduce a hydrostatic pressure of the drilling fluid to a value at or below a hydrostatic pressure of the formation being drilled, where the effective amount of bio-degradable foaming composition is between 0.42 lb/bbl and 4.2 lb/bbl having a foam height between 160 mL and 530 mL and foam half-lives between 0:22 and 21:48.

2. The method of claim 1, wherein the foaming composition further comprises at least one additive selected from the group consisting of sulfur scavengers, corrosion inhibitors, scale inhibitors, oxygen control agents, hydrocarbon accumulation agents and mixtures or combinations thereof, where the foam improves an activity of the at least one additive and the additive may improve foaming characteristics of the at least one hydrolyzed keratin.

3. The method of claim 1, wherein the foaming composition further comprises a foaming additive selected from the group consisting of winterizing agents, foam boosters, anti-freeze agents, solvents, sodium salt of alpha olefin sulfonates (AOSs), acid salts, fatty acids, foam enhancers and mixtures or combinations thereof.

4. The method of claim 3, wherein the winterizing agents are selected from the group consisting of lithium formate, sodium formate, potassium formate, cesium formate, triethyanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

5. A method for drilling comprising the steps of
drilling an oil and/or gas well with a drilling fluid while changing an effective amount of a bio-degradable foaming composition and an effective amount of a gas so that a hydrostatic pressure of the drilling fluid is maintained at a desired level at or below a hydrostatic pressure of the formation being drilled, where the foaming composition comprises at least one hydrolyzed keratin, where the effective amount of bio-degradable foaming composition is between 0.42 lb/bbl and 4.2 lb/bbl having a foam height between 160 mL and 530 mL and foam half-lives between 0:22 and 21:48.

6. The method of claim 5, wherein the foaming composition further comprises at least one additive selected from the group consisting of sulfur scavengers, corrosion inhibitors, scale inhibitors, oxygen control agents, hydrocarbon accumulation agents and mixtures or combinations thereof, where the foam improves an activity of the at least one additive and the additive may improve foaming characteristics of the at least one hydrolyzed keratin.

7. The method of claim 5, wherein the foaming composition further comprises a foaming additive selected from the group consisting of winterizing agents, foam boosters, anti-freeze agents, solvents, sodium salt of alpha olefin sulfonates (AOSs), acid salts, fatty acids, foam enhancers and mixtures or combinations thereof.

8. The method of claim 7, wherein the winterizing agents is selected from the group consisting of lithium formate, sodium formate, potassium formate, cesium formate, triethyanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

9. A method for drilling comprising the steps of
drilling a first section of an oil and/or gas well with a drilling fluid, where a hydrostatic pressure of the drilling fluid is maintained at a desired level above a hydrostatic pressure of the formation being drilled, and
drilling a second section of the well with a drilling fluid including an effective amount of a bio-degradable foaming composition and an effective amount of a gas so that a hydrostatic pressure of the drilling fluid is maintained at a desired level at or below a hydrostatic pressure of the formation being drilled, where the foaming composition comprises at least one hydrolyzed keratin and where the effective amount of bio-degradable foaming composition is between 0.42 lb/bbl and 4.2 lb/bbl having a foam height between 160 mL and 530 mL and foam half-lives between 0:22 and 21:48.

10. The method of claim 9, wherein the foaming composition further comprises at least one additive selected from the group consisting of sulfur scavengers, corrosion inhibitors, scale inhibitors, oxygen control agents, hydrocarbon accumulation agents and mixtures or combinations thereof, where the foam improves an activity of the at least one additive and the additive may improve foaming characteristics of the at least one hydrolyzed keratin.

11. The method of claim 9, wherein the foaming composition further comprises a foaming additive selected from the group consisting of winterizing agents, foam boosters, antifreeze agents, solvents, sodium salt of alpha olefin sulfonates (AOSs), acid salts, fatty acids, foam enhancers and mixtures or combinations thereof.

12. The method of claim 11, wherein the winterizing agents are selected from the group consisting of lithium formate, sodium formate, potassium formate, cesium formate, triethyanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

13. A method for foaming a fluid comprising the steps of:
inserting at least one capillary coiled tubing into a well borehole to a desired depth below a fluid level in the borehole and
injecting an effective amount of a bio-degradable foaming composition and an effective amount of a gas into the fluid to produce a foam,
where the foaming composition comprises at least one hydrolyzed keratin and where the effective amounts are sufficient to decrease a fluid column weight and to increase well fluids flow out of the well and where the effective amount of bio-degradable foaming composition is between 0.42 lb/bbl and 4.2 lb/bbl having a foam height between 160 mL and 530 mL and foam half-lives between 0:22 and 21:48.

14. The method of claim 13, wherein the injecting comprises a single injection, multiple injections, periodic injections, continuation injections or mixtures or combinations thereof, depending on well requirements and desired flow rates.

15. The method of claim 13, wherein the foaming composition further comprises at least one additive selected from the group consisting of sulfur scavengers, corrosion inhibitors, scale inhibitors, oxygen control agents, hydrocarbon accumulation agents and mixtures or combinations thereof, where the foam improves an activity of the at least one additive and the additive may improve foaming characteristics of the at least one hydrolyzed keratin.

16. The method of claim 13, wherein the foaming composition further comprises a foaming additive selected from the group consisting of winterizing agents, foam boosters, antifreeze agents, solvents, sodium salt of alpha olefin sulfonates (AOSs), acid salts, fatty acids, foam enhancers and mixtures or combinations thereof.

17. The method of claim 16, wherein the winterizing agents are selected from the group consisting of lithium formate, sodium formate, potassium formate, cesium formate, triethyanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

18. A method comprising the steps of:
injecting into a downhole fluid an aqueous solution comprising a first effective amount of a bio-degradable foaming composition and an effective amount of a gas to produce a foam;
bringing the foam to a surface of the well;
adding a defoaming agent to the foam at the surface to break the foam and produce a two phase system;
separating production or organic fluids from the two phase system; and
optionally second adding a supplemental effective amount of the bio-degradable foaming composition to reform a foam, and
repeating the injecting, bringing, adding, separating and optional second adding steps,
where the foaming composition comprises at least one at least one hydrolyzed keratin and where the effective amounts are sufficient to decrease a fluid column weight and to increase well fluids flow out of the well and where the effective amount of bio-degradable foaming composition is between 0.42 lb/bbl and 4.2 lb/bbl having a foam height between 160 mL and 530 mL and foam half-lives between 0:22 and 21:48.

19. The method of claim 18, further comprising the steps of:
repeating the injecting, bringing, adding, separating and optional second adding steps a desired number of times.

20. The method of claim 18, wherein the foaming composition further comprises at least one additive selected from the group consisting of sulfur scavengers, corrosion inhibitors, scale inhibitors, oxygen control agents, hydrocarbon accumulation agents and mixtures or combinations thereof, where the foam improves an activity of the at least one additive and the additive may improve foaming characteristics of the at least one hydrolyzed keratin.

21. The method of claim 18, wherein the foaming composition further comprises a foaming additive selected from the group consisting of winterizing agents, foam boosters, anti-freeze agents, solvents, sodium salt of alpha olefin sulfonates (AOSs), acid salts, fatty acids, foam enhancers and mixtures or combinations thereof.

22. The method of claim 21, wherein the winterizing agents are selected from the group consisting of lithium formate, sodium formate, potassium formate, cesium formate, triethyanolamine formate, and mixtures or combinations; the foam boosters comprise a cellosolve of the general formula $R^9OCH_2CH_2OH$ where $R^9$ is an alkyl group having between about 2 and about 8 carbon atoms and mixtures or combinations; the anti-freeze agents selected from the group consisting of alcohols, glycols or other freezing point depressing agents and mixtures or combinations; the solvents selected from the group consisting of water, alcohols, ethers, esters or mixtures or combinations thereof; the sodium salt of alpha olefin sulfonates (AOSs) selected from the group consisting of short chain alpha olefin sulfonates having between about 2 and about 10 carbon atoms, longer chain alpha olefin sulfonates having between about 10 and about 24 carbon atoms and mixtures or combinations thereof; the acid salts selected from the group consisting of cyclamic acid salts such as sodium (cyclamate), potassium, salts of sulfonated methyl esters having between about 12 and about 22 carbon atoms, where the salt is sodium, potassium, ammonium, alkylammonium, salts of 2-aminoethane sulfonic acids, where the salt is an alkali metal, ammonium, or alkylammonium, and mixtures or combinations thereof; the fatty acids are selected from the group consisting of lauric acid, oleic acid, stearic acid and mixtures or combinations; and the foam enhancers are selected from the group consisting of a linear dodecyl benzene sulfonic acid salt, a sarcosinate salt, and mixtures or combinations thereof.

* * * * *